(12) United States Patent
Hasegawa et al.

(10) Patent No.: US 9,548,685 B2
(45) Date of Patent: Jan. 17, 2017

(54) OVER-VOLTAGE PREVENTION DEVICE AND CURRENT RECTIFYING CIRCUIT

(71) Applicant: Kabushiki Kaisha Toshiba, Minato-ku (JP)

(72) Inventors: Ryuta Hasegawa, Hino (JP); Teruyuki Ishizuki, Tokyo (JP); Takashi Fujita, Tokyo (JP); Takahisa Kageyama, Ichikawa (JP); Yutaro Kitamori, Fuchu (JP); Sho Sato, Kunitachi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 82 days.

(21) Appl. No.: 14/605,424

(22) Filed: Jan. 26, 2015

(65) Prior Publication Data

US 2015/0214870 A1   Jul. 30, 2015

(30) Foreign Application Priority Data

Jan. 27, 2014   (JP) ................................. 2014-012825

(51) Int. Cl.
*H02P 1/26* (2006.01)
*H02P 6/00* (2016.01)
(Continued)

(52) U.S. Cl.
CPC ............... *H02P 6/005* (2013.01); *H02H 7/06* (2013.01); *H02P 9/007* (2013.01); *H02P 29/024* (2013.01);
(Continued)

(58) Field of Classification Search
USPC .............. 318/732, 400.21, 400.22, 782, 299, 515,318/528; 290/44, 11, 14, 32, 40 B, 40 C, 40 F See application file for complete search history.

(56) References Cited

U.S. PATENT DOCUMENTS

| 4,812,729 A | * | 3/1989 | Ito | ........................ H02H 7/1216 318/732 |
| 5,365,397 A | * | 11/1994 | Kadota | .............. H03K 17/0822 361/18 |

(Continued)

FOREIGN PATENT DOCUMENTS

| EP | 2 644 885 A2 | 10/2013 |
| JP | 6-54444 | 2/1994 |
| WO | WO 03/065567 A1 | 8/2003 |

OTHER PUBLICATIONS

Extended European Search Report issued Jun. 16, 2015 in Patent Application No. 15152466.7.

(Continued)

*Primary Examiner* — Jorge L Carrasquillo
(74) *Attorney, Agent, or Firm* — Oblon, McClelland, Maier & Neustadt, L.L.P.

(57) ABSTRACT

According to one embodiment, an over-voltage prevention device includes a first short-circuit device provided between a secondary side of a wound-rotor induction machine and a frequency converter configured to excite the secondary side by a three-phase AC current and having a function of short-circuiting between phases of the three-phase AC current, resistors each connected between the first short-circuit device and the frequency converter for each phase, and second short-circuit devices connected respectively to the resistors in parallel and having a function of short-circuiting between the frequency converter and the secondary side of the wound-rotor induction machine.

15 Claims, 5 Drawing Sheets

(51) Int. Cl.
*H02H 7/06* (2006.01)
*H02P 9/00* (2006.01)
*H02P 29/02* (2016.01)
*H02H 7/12* (2006.01)
*H02H 9/00* (2006.01)

(52) U.S. Cl.
CPC ............ *H02P 29/0241* (2016.02); *H02H 7/12* (2013.01); *H02H 9/002* (2013.01)

(56) References Cited

U.S. PATENT DOCUMENTS

| | | | | |
|---|---|---|---|---|
| 7,276,807 | B2* | 10/2007 | Luetze | H02H 7/067 290/44 |
| 2005/0116476 | A1* | 6/2005 | Feddersen | F03D 9/003 290/44 |
| 2006/0163881 | A1* | 7/2006 | Bucker | H02P 9/007 290/44 |
| 2006/0192390 | A1* | 8/2006 | Juanarena Saragueta | F03D 9/002 290/44 |
| 2011/0266800 | A1* | 11/2011 | Inzunza Figueroa | H02P 9/007 290/44 |
| 2013/0056985 | A1* | 3/2013 | Lu | H02H 7/067 290/44 |
| 2013/0200620 | A1* | 8/2013 | Gupta | F03D 7/0284 290/44 |
| 2013/0249501 | A1* | 9/2013 | Lu | F03D 7/0224 322/21 |

OTHER PUBLICATIONS

Dr. Jürgen Ehrenberg, et al., "Windkraftanlagen fur den Megawatt-Bereich Digitale Steuerung eines doppelt gespeisten Asynchrongenerators ohne Lagegeber, Teil 1" Elektronik, vol. 50, No. 18, XP001168391, 2001, pp. 60-67.

* cited by examiner

OVER-VOLTAGE PREVENTION DEVICE AND CURRENT RECTIFYING CIRCUIT

CROSS-REFERENCE TO RELATED APPLICATIONS

This application is based upon and claims the benefit of priority from Japanese Patent Application No. 2014-012825, filed Jan. 27, 2014, the entire contents of which are incorporated herein by reference.

FIELD

Embodiments described herein relate generally to an over-voltage prevention device which protects a frequency converter or a secondary winding of a wound-rotor induction machine from an over-voltage, and a current rectifying circuit provided in the over-voltage prevention device.

BACKGROUND

In the configuration where the primary side of a wound-rotor induction machine is connected to the electric power system, and the secondary side is excited by an AC current with a slip frequency, such as a static Scherbius system or a super-synchronous Scherbius system, if the primary side of the wound-rotor induction machine becomes unbalanced, an inverse-phase current flows in, and a current with a frequency of $2f_1 \pm sf_1$ (where $f_1$ is a frequency of the electric power system, and s is a slip) flows into the secondary side. If a DC current component flows into the primary side, a current of $f_r$ (rotation frequency of a rotor) flows into the secondary side.

However, it is difficult for a frequency converter which excites the secondary side of the wound-rotor induction machine by an AC current with the slip frequency to cause a current with a frequency of $2f_1 \pm sf_1$ or $f_r$ to flow into the secondary side. In this case, a power semiconductor element (e.g., GTO or IGBT) within the frequency converter cannot be turned on, and the secondary side of the wound-rotor induction machine is opened, thereby producing an abnormally high voltage. If a high voltage occurs in the secondary side of the wound-rotor induction machine, the dielectric breakdown may occur in the secondary winding and the frequency converter.

To solve the above problem, there is a method for protecting a secondary winding or a frequency converter from an over-voltage by directly short-circuiting the secondary winding or short-circuiting the secondary winding through a resistance to suppress the voltage to be nearly zero when an over-voltage occurs at the secondary side of the wound-rotor induction machine.

Figure 4:
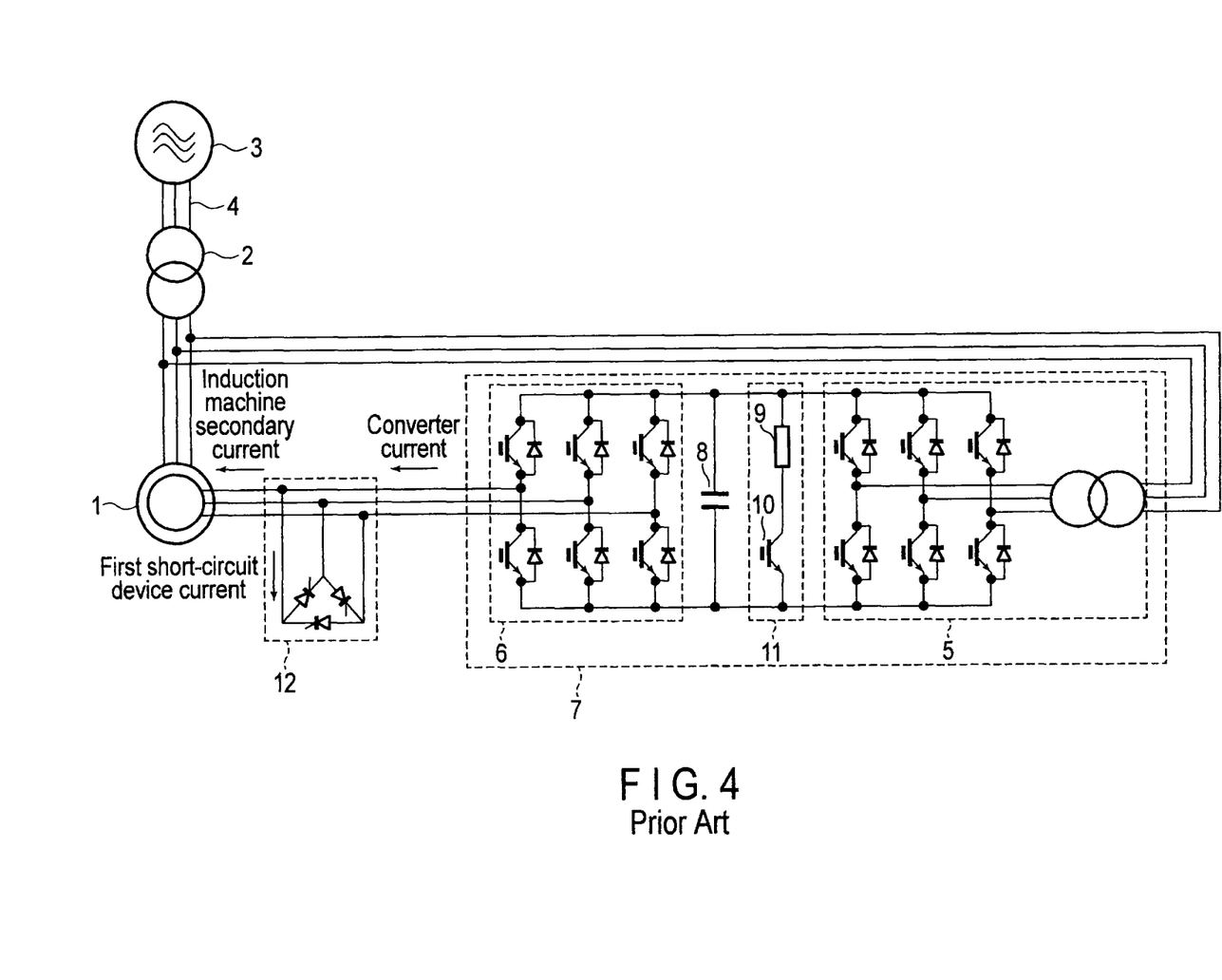
FIG. 4 illustrates an example of a configuration of a circuit including the conventional secondary over-voltage prevention device.

FIG. 4 shows an example of a circuit structure including a secondary over-voltage prevention device of the conventional wound-rotor induction machines.

As shown in FIG. 4, a primary winding terminal of a wound-rotor induction machine 1 is connected to an electric power system 3 through a main transformer 2 and a power transmission line 4. A voltage of the primary winding terminal of a wound-rotor induction machine 1 is converted to a voltage equivalent to that of the electric power system 3 at the main transformer 2, and then supplied to the electric power system 3 through the power transmission line 4.

The secondary winding terminal of the wound-rotor induction machine 1 is connected, through a first short-circuit device 12, to a frequency converter 7 comprising, for example, a self-excited converter 5/inverter 6 connected to the main transformer 2.

At the frequency converter 7, a three-phase AC voltage is converted to a DC voltage by the converter 5, and the DC voltage is stored at the DC link capacitor 8. In addition, the DC voltage is then converted to a three-phase AC voltage corresponding to a slip frequency of the wound-rotor induction machine 1 by the inverter 6. The frequency converter 7 excites the secondary side of the wound-rotor induction machine 1 by the three-phase AC voltage. The frequency converter 7 comprises a chopper 11 including a resistor 9 and a power semiconductor element 10 (e.g., GTO or IGBT) to protect an element forming the converter 5 or the inverter 6 from an over-voltage due to an increase of DC link voltage.

A first short-circuit device 12 is provided between the frequency converter 7 and the secondary winding terminal of the wound-rotor induction machine 1. The first short-circuit device 12 has a function of short-circuiting between phases of three-phase AC currents when an over-voltage is produced at the secondary side of the wound-rotor induction machine 1.

Figure 5:
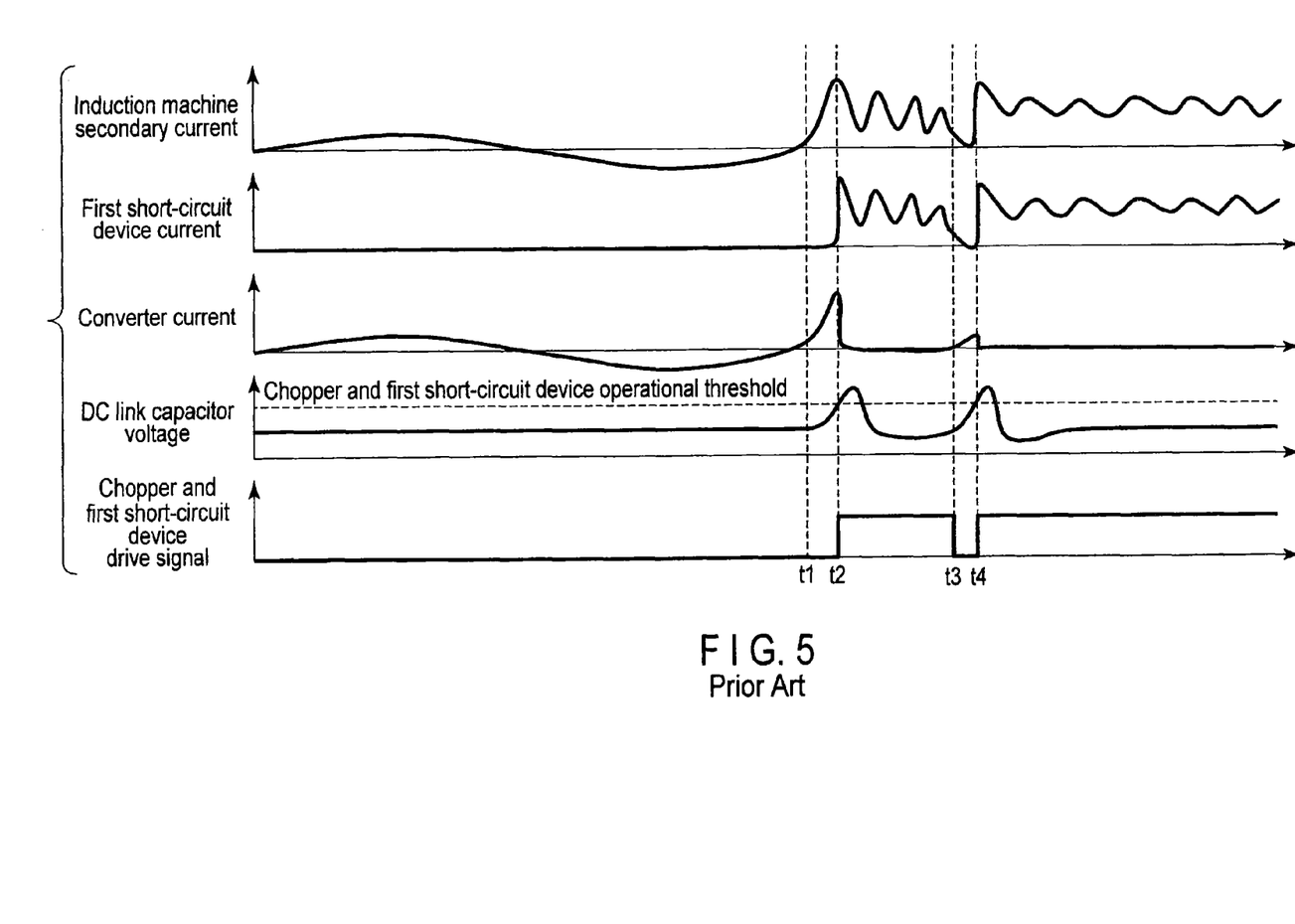
FIG. 5 illustrates a timing chart indicating the operation of the conventional secondary over-voltage prevention device of the wound-rotor induction machine 1.

Next, the operation of the secondary over-voltage prevention device of the wound-rotor induction machine 1 having the aforementioned configuration will be explained with reference to the timing chart of FIG. 5.

It is assumed that a failure occurs in the electric power system 3 or the power transmission line 4 at the time t1, and the primary side of the wound-rotor induction machine 1 becomes unbalanced, and an AC current of $2f_1 \pm sf_1$ is produced at the secondary side due to the inverse phase component. In this case, the frequency converter 7 cannot tolerate the AC current, and the secondary winding of the wound-rotor induction machine 1 becomes momentarily opened, thereby producing an over-voltage. The over-voltage is rectified by a diode of the inverter 6 of the frequency converter 7, and the DC link capacitor 8 is recharged. Accordingly, the capacitor voltage increases.

If an over-voltage above a threshold is produced at the secondary winding of the wound-rotor induction machine 1 or the DC link capacitor 8, the chopper 11 and the short-circuit device 12 are activated at the time t2. In an actual case, the chopper 11 is activated first, and if the over-voltage is not eliminated after a predetermined time has elapsed, the first short-circuit device 12 is activated; however, the illustration is simplified so that the overall operation may be easily understood.

By the above operation, the first short-circuit device 12 performs three-phase short-circuiting to the secondary winding of the wound-rotor induction machine 1 and the output-side of the frequency converter 7.

Then, a short-circuit current flows between phases in the secondary side of the wound-rotor induction machine 1 through the first short-circuit device 12, and the short-circuit current decays in accordance with the time constant of the secondary winding of the wound-rotor induction machine 1.

Next, the short-circuiting of the first short-circuit device 12 is terminated at the time t3 in consideration of the time when the failure in the electric power system 3 or the power transmission line 4 is eliminated. Since the first short-circuit device 12 is formed of a thyristor with high current tolerance, the first short-circuit device 12 cannot be turned off unless the short-circuit current becomes zero. The frequency converter 7 is restarted to apply a voltage in the direction opposite to the short-circuit current flowing through the first short-circuit device 12 so that the current flowing through the first short-circuit device 12 becomes zero.

However, with the conventional systems, when an inverse voltage is applied to cause the current flowing through the first short-circuit device 12 to be zero, there may be a case where the short-circuit current that was flowing through the first short-circuit device 12 flows into the frequency converter 7 at the time t4, the DC link voltage increases again, and the chopper 11 and the first short-circuit device 12 are reactivated. As a result, the temperature in the resistor 9 of the chopper 11, the element 10 and the thyristor of the first short-circuit device 12 may increase, and they may be broken.

There is a possible way to avoid this by increasing the rated values of the chopper 11 or the first short-circuit device 12. However, this increases the cost or requires oversizing of the chopper 11 or the first short-circuit device 12.

In addition, since the current flowing through the first short-circuit device 12 decays in accordance with the time constant of the secondary winding of the wound-rotor induction machine 1, the time required for the current to become zero will increase by the order of a few seconds as the reactance of the wound-rotor induction machine 1 will increase. Accordingly, the time required for restarting will increase.

Under the above circumstances, it is desired to provide an over-voltage prevention device and a current-rectifying circuit, which are capable of recovering from a failure in the electric power system within a short time and ensuring continuous operation with a simple structure.

DETAILED DESCRIPTION

In general, according to one embodiment, an over-voltage prevention device includes a first short-circuit device provided between a secondary side of a wound-rotor induction machine and a frequency converter configured to excite the secondary side by a three-phase AC current and having a function of short-circuiting between phases of the three-phase AC current, resistors each connected between the first short-circuit device and the frequency converter for each phase, and second short-circuit devices connected respectively to the resistors in parallel and having a function of short-circuiting between the frequency converter and the secondary side of the wound-rotor induction machine.

Hereinafter, embodiments will be described with reference to the accompanying drawings.

First Embodiment

The first embodiment of the present invention will be explained with reference to FIGS. 1 and 2.

Figure 1:
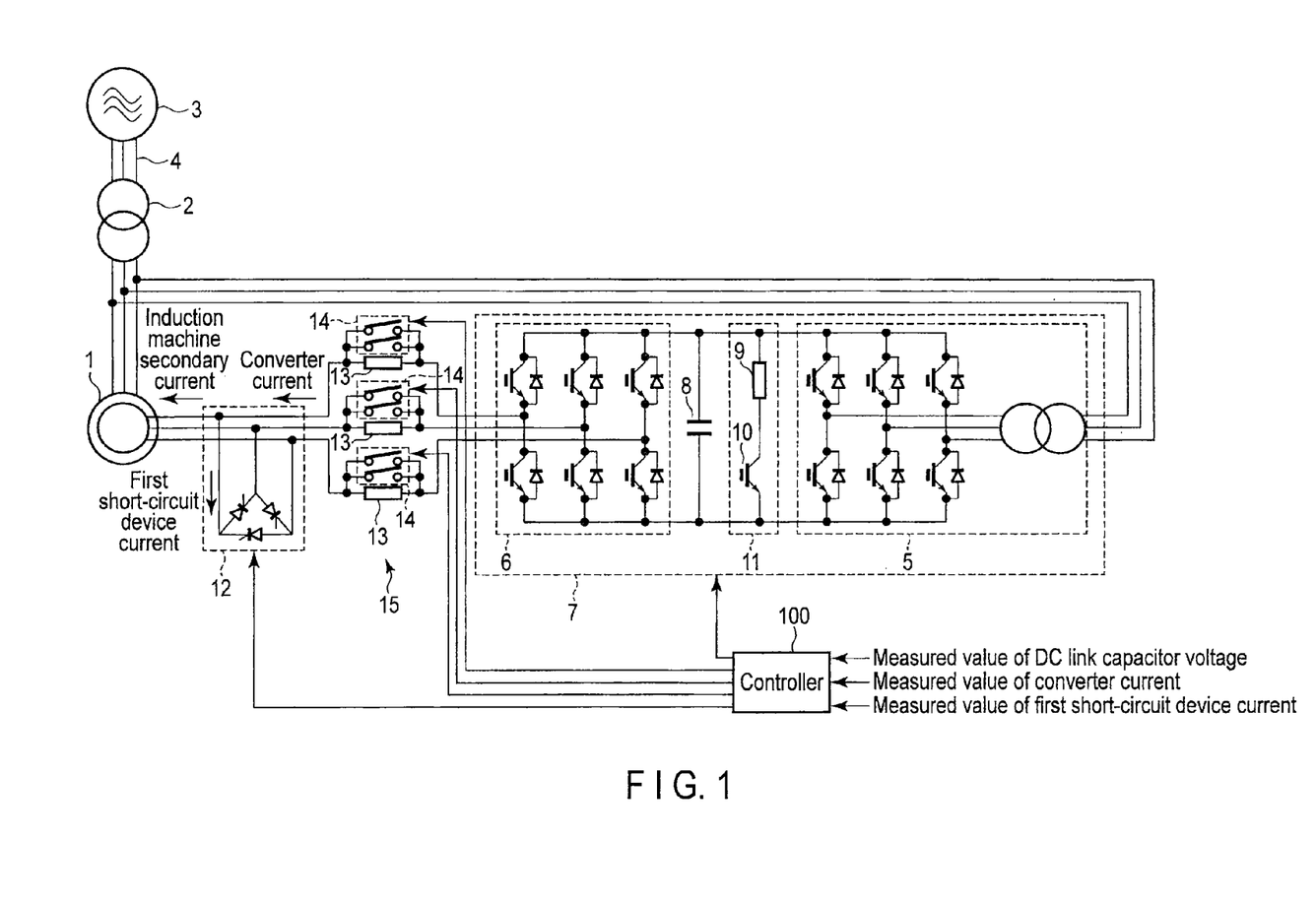
FIG. 1 illustrates an example of a configuration of a circuit including a secondary over-voltage prevention device of the wound-rotor induction machine 1 according to the first embodiment.

FIG. 1 illustrates an example of a configuration of a circuit including a secondary over-voltage prevention device of the wound-rotor induction machine 1 according to the first embodiment. In FIG. 1, the same reference numerals as in FIG. 4 denote the same elements.

As shown in FIG. 1, a primary winding terminal of the wound-rotor induction machine 1 is connected to the electric power system 3 through the main transformer 2 and the power transmission line 4. A voltage of the primary winding terminal of the wound-rotor induction machine 1 is converted to a voltage equivalent to that of the electric power system 3 at the main transformer 2, and then supplied to the electric power system 3 through the power transmission line 4.

The secondary winding terminal of the wound-rotor induction machine 1 is connected, through a first short-circuit device 12 and a current rectifying circuit 15, to a frequency converter 7 comprising, for example, a self-excited converter 5/inverter 6 connected to the main transformer 2.

At the frequency converter 7, a three-phase AC voltage is converted to a DC voltage by the converter 5, and the DC voltage is stored at the DC link capacitor 8. In addition, the DC voltage is then converted to a three-phase AC voltage corresponding to a slip frequency of the wound-rotor induction machine 1 by the inverter 6. The frequency converter 7 excites the secondary side of the wound-rotor induction machine 1 by the three-phase AC voltage. The frequency converter 7 comprises a chopper 11 including a resistor 9 and a power semiconductor element 10 (e.g., GTO or IGBT) to protect an element forming the converter 5 or the inverter 6 from an over-voltage due to a DC link voltage increase.

The first short-circuit device 12 and the current rectifying circuit 15 are provided between the frequency converter 7 and the secondary winding terminal of the wound-rotor induction machine 1 in this embodiment. The first short-circuit device 12 has a function of short-circuiting between phases of three-phase AC currents when an over-voltage is produced at the secondary side of the wound-rotor induction machine 1. The current rectifying circuit 15 comprises resistors 13 each connected between the first short-circuit device 12 and the frequency converter 7 for each phase and second short-circuit devices 14 connected respectively to the resistors 13 in parallel. The second short-circuit device 14 has a function of short-circuiting between the frequency converter 7 and the secondary side of the wound-rotor induction machine 1. The second short-circuit device 14 is formed of a plurality of mechanic breakers connected in parallel, as shown in FIG. 1.

A controller 100 controls the secondary side of the wound-rotor induction machine 1. A part of the controller 100 forms the secondary over-voltage prevention device together with the first short-circuit device 12 and the current rectifying circuit 15. The controller 100 obtains a measured value of voltage at the DC link capacitor 8 (capacitor voltage), a measured value of current flowing from the frequency converter 7 (converter current) and a measured value of current flowing through the first short-circuit device 12 (first short-circuit device current) through various sensors placed at particular spots, and drives each element included in the converter 5/inverter 6, the first short-circuit device 12, and the second short-circuit devices 14, based on the obtained measured values.

For example, if an over-voltage at the secondary side of the wound-rotor induction machine 1 is detected through the various sensors due to a failure in the electric power system (for example, short-circuit in the power transmission line 4), the controller 100 controls the first short-circuit device 12 to perform short-circuiting, stops the frequency converter 7, and cancels short-circuiting of the second short-circuit devices 14. After the failure is eliminated, the controller 100 restarts the frequency converter 7 to set the current flowing through the first short-circuit device 12 to be zero, cancels short-circuiting of the first short-circuit device 12, and then controls the second short-circuit devices 14 to perform short-circuiting after a predetermined time has elapsed.

It is desirable that the resistance of the resistor 13 is a value ensuring that the capacitor voltage at a time when the short-circuit current flows into the frequency converter 7 from the first short-circuit device 12 due to restart of the frequency converter 7 is below an operational threshold of the first short-circuit device 12. In addition, it is desirable that the resistance of the resistor 13 is smaller than a value obtained by dividing the maximum output voltage of the frequency converter 7 by the estimated maximum current when flowing from the first short-circuit device 12 into the frequency converter 7. By setting the resistance of the resistor 13 as indicated above, it is possible to minimize short-circuit current flowing from the first short-circuit device 12 to the frequency converter 7.

Since the short-circuiting of the second short-circuit devices 14 is canceled when a current becomes zero, a low-cost mechanical breaker or a disconnector without a current blocking function may be utilized instead of the breaker. Otherwise, a plurality of mechanical breakers connected in parallel may be used as the second short-circuit devices 14. In the configuration where a plurality of breakers are used, even if one of the breakers is erroneously opened during normal operation, a current flows into the parallel breakers. Accordingly, continuous operation or safe operation can be realized without producing an arc.

Next, the operation of the secondary over-voltage prevention device of the wound-rotor induction machine 1 having the aforementioned configuration will be explained with reference to the timing chart of FIG. 2.

Figure 2:
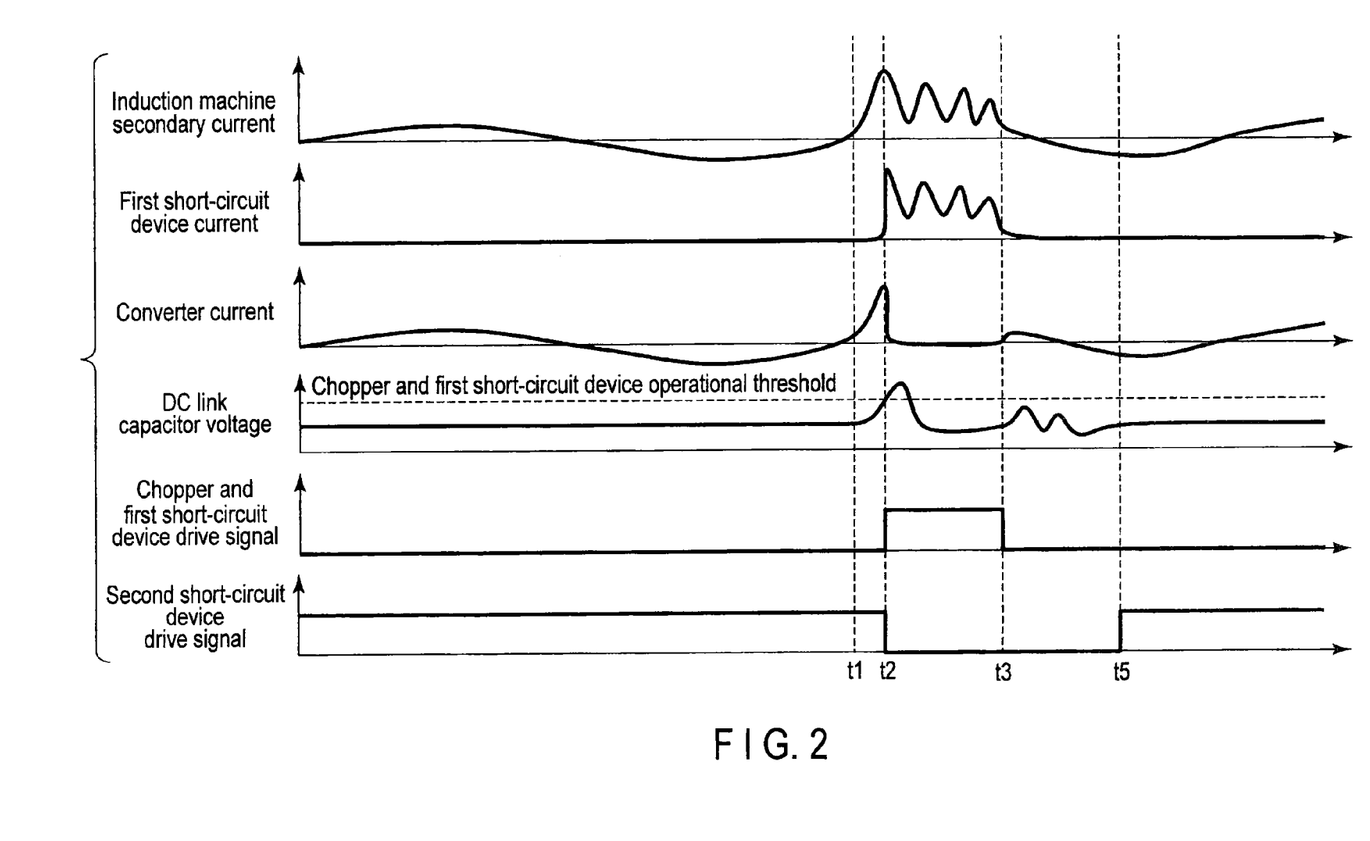
FIG. 2 illustrates a timing chart indicating the operation of the secondary over-voltage prevention device of the wound-rotor induction machine 1 according to the first embodiment.

In the timing chart shown in FIG. 2, the interval between time t1 and time t2 is about 10 msec, the interval between time t2 and time t3 is about 70 msec, and the interval between time t2 and time t4 is about 200 msec.

It is assumed that a failure occurs in the electric power system 3 or the power transmission line 4 at the time t1, and the primary winding of the wound-rotor induction machine 1 becomes unbalanced, and a AC voltage of $2f_1 \pm sf_1$ is produced at the secondary side due to the inverse phase component. In this case, the frequency converter 7 cannot follow the produced voltage, and the secondary winding of the wound-rotor induction machine 1 becomes momentarily opened, thereby producing an over-voltage. The over-voltage is rectified by a diode of the inverter 6 of the frequency converter 7, and the DC link capacitor 8 is recharged. Accordingly, the capacitor voltage increases.

If the over-voltage is detected at time t2, the chopper 11 and the first short-circuit device 12 are activated. In an actual case, the chopper 11 is activated first, and if the over-voltage is not overcome after a predetermined time has elapsed, the first short-circuit device 12 is activated; however, the illustration is simplified so that the overall operation may be easily understood.

By the above operation, the first short-circuit device 12 performs three-phase short-circuiting to the secondary winding of the wound-rotor induction machine 1 and the output-side of the frequency converter 7.

In this case, all elements of the frequency converter 7 are stopped by gate blocking, and accordingly, while the failure is occurring a fault current flows between the secondary winding of the wound-rotor induction machine 1 and the first short-circuit device 12. At this time, an output current of the inverter 6 becomes zero, and the short-circuiting of the second short-circuit devices 14 is canceled.

After the failure in the electric power system 3 or the power transmission line 4 is eliminated, the short-circuiting of the first short-circuit device 12 is canceled at the time t3. Since the first short-circuit device 12 is formed of a thyristor, it is not possible to cause the current to be zero even by switching a gate signal off. Accordingly, when a short-circuit canceling signal is sent to the first short-circuit device 12, the frequency converter 7 is driven, and an inverse voltage is applied to the thyristor. As a result, the short-circuit current flows from the first short-circuit device 12 to the frequency converter 7 through the resistor 13.

At the time t5 when the current of the frequency converter 7 becomes a steady state, the second short-circuit device 14 is controlled to execute short-circuiting to return to the normal operation.

According to the first embodiment, after a failure in the electric power system, short-circuiting of the first short-circuit device 12 is canceled, and a short-circuit current flows into the frequency converter 7 through the resistor 13, thereby reducing the current to flow into the frequency converter 7, and suppressing increase of the DC link voltage. Since the capacitor voltage at a time when flowing into the frequency converter 7 does not reach an operational threshold, the first short-circuit device 12 is not reactivated. In addition, the system can be recovered from the failure in a short time without depending on a time constant or an operation condition of the secondary winding of the wound-rotor induction machine 1.

Second Embodiment

The second embodiment will be explained with reference to FIG. 3 together with FIGS. 1 and 2. In the second embodiment, the same reference numerals as in the first embodiment denote the same elements, a detailed explanation thereof will be omitted, and different portions will mainly be described.

Figure 3:
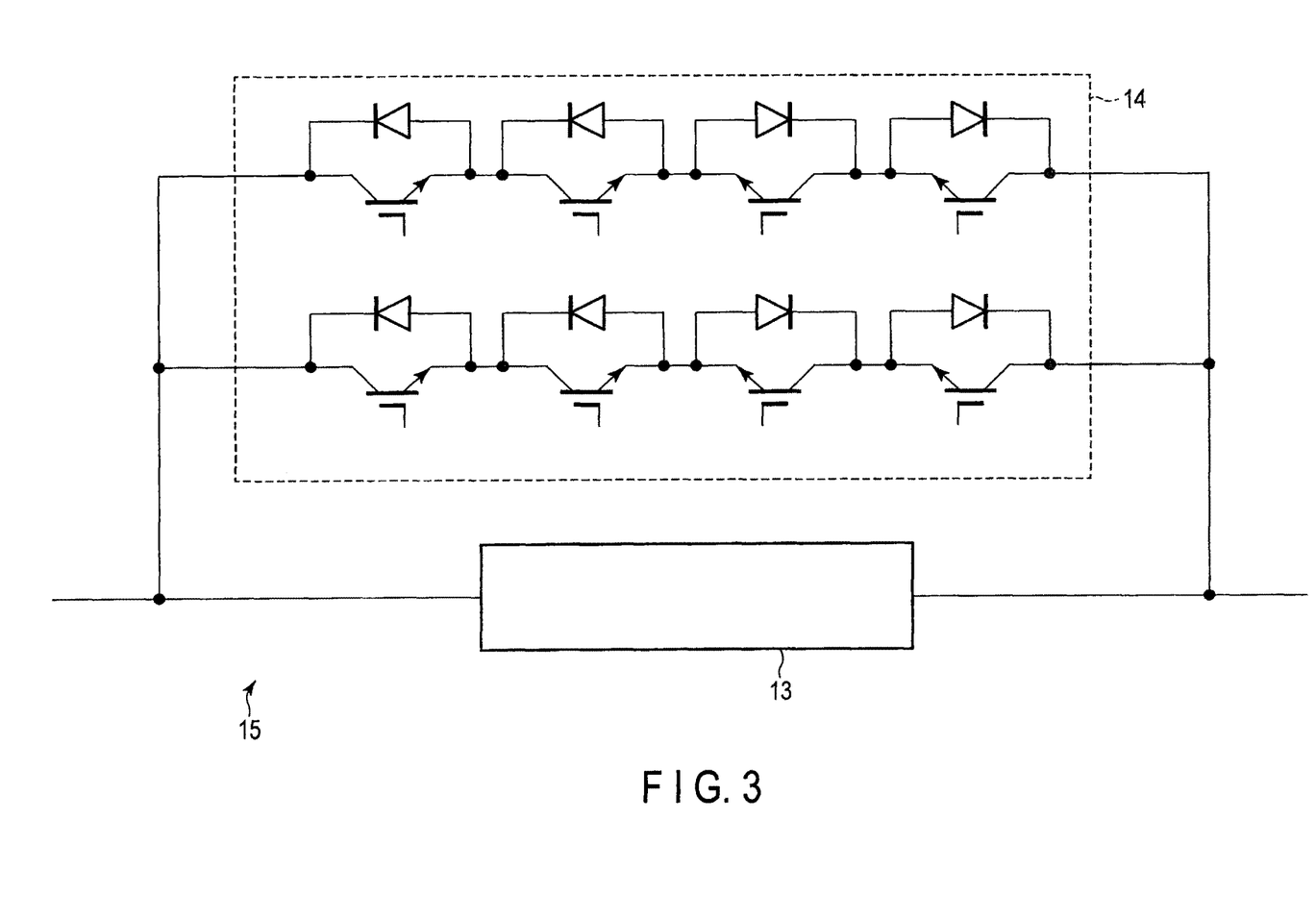
FIG. 3 illustrates a configuration where a semiconductor breaker is used instead of a mechanic breaker.

In the second embodiment, a semiconductor breaker is utilized for the second short-circuit device 14, instead of the mechanical breaker, as shown in FIG. 3. Specifically, the semiconductor breaker is configured of a power semiconductor element such as an IGBT or a GTO and a diode connected in anti-parallel. An AC current continuously flows by connecting them in anti-series.

In the above configuration, the current amount and the number of parallel connections are determined by a current flowing through the semiconductor in normal operation. In addition, the number of series connections and the withstand voltage of the semiconductor breaker are determined based on voltage decrease when a short-circuit current flows through the resistor 13. The number of parallel connections or series connections may increase in consideration of the case where a failure occurs in the semiconductor breaker.

The timings of activating and inactivating the second short-circuit device are the same as those explained in the first embodiment.

According to the second embodiment, it is possible to realize high-speed short-circuiting and canceling operations by utilizing the semiconductor breaker as the second short-circuit device. This allows the system to recover from a failure in a short time when a failure occurs continuously in a short time period. In addition, it is possible to reduce the interval between t3 to t5 during which a current flows into the resistor 13, thereby reducing the capacity of the resistor.

As stated above, according to the aforementioned embodiments, it is possible to realize a short-term recovery from a failure in the electric power system with a simple structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An over-voltage prevention device comprising:
a first short-circuit device provided between a secondary side of a wound-rotor induction machine and a frequency converter configured to excite the secondary side by a three-phase AC current and having a function of short-circuiting between phases of the three-phase AC current;
resistors each connected between the first short-circuit device and the frequency converter for each phase; and
second short-circuit devices connected respectively to the resistors in parallel and having a function of short-circuiting between the frequency converter and the secondary side of the wound-rotor induction machine
a controller i) configured to, in response to a detection of an over-voltage at the secondary side of the wound-rotor induction machine, activate the first short-circuit device to perform short-circuiting, deactivate the frequency converter, and cancel short-circuiting of the second short-circuit devices, at a first time point ii) configured to restart the frequency converter to set the current flowing through the first short-circuit device to be zero, and cancel short-circuiting of the first short-circuit device, at a second time point after a predetermined time period has elapsed from the first time point and iii) configured to control the second short-circuit devices to perform short-circuiting, at a third time point after a predetermined time has elapsed from the first time point, wherein the third time point comes after the second time point comes,
the over-voltage prevention device being controllable such that a short-circuit current flows from the first short-circuit device through the resistors into the frequency converter when short-circuiting of the first short-circuit device is canceled.

2. The over-voltage prevention device according to claim 1, wherein a resistance of the resistor is smaller than a value obtained by dividing a maximum output voltage of the frequency converter by a maximum current when flowing from the first short-circuit device through the resistor into the frequency converter.

3. The over-voltage prevention device according to claim 1, wherein a resistance of the resistor is a value ensuring that a voltage of a DC link capacitor provided in the frequency converter at a time when a short-circuit current flows into the frequency converter from the first short-circuit device due to restart of the frequency converter is below an operational threshold of the first short-circuit device.

4. The over-voltage prevention device according to claim 1, wherein the second short-circuit device is formed of a mechanical breaker.

5. The over-voltage prevention device according to claim 1, wherein the second short-circuit device is formed of a plurality of mechanic breakers connected in parallel.

6. The over-voltage prevention device according to claim 1, wherein the second short-circuit device is formed of a semiconductor breaker.

7. The over-voltage prevention device according to claim 1, wherein the second short-circuit device is formed of a plurality of semiconductor breakers connected in parallel.

8. The over-voltage prevention device according to claim 1, wherein a resistance of the resistor is smaller than a value obtained by dividing a maximum output voltage of the frequency converter by a maximum current when flowing from the first short-circuit device through the resistor into the frequency converter.

9. A current rectifying circuit applied to a device which includes a frequency converter configured to excite a secondary side of a wound-rotor induction machine by a three-phase AC current, and a first short-circuit device provided between the secondary side of the wound-rotor induction machine and the frequency converter and having a function of short-circuiting between phases of the three-phase AC current, the current rectifying circuit comprising:
resistors each connected between the first short-circuit device and the frequency converter for each phase; and
second short-circuit devices connected respectively to the resistors in parallel and having a function of short-circuiting between the frequency converter and the secondary side of the wound-rotor induction machine,
a controller i) configured to, in response to a detection of an over-voltage at the secondary side of the wound-rotor induction machine, activate the first short-circuit device to perform short-circuiting, deactivate the frequency converter, and cancel short-circuiting of the second short-circuit devices, at a first time point ii) configured to restart the frequency converter to set the current flowing through the first short-circuit device to be zero, and cancel short-circuiting of the first short-circuit device, at a second time point after a predetermined time period has elapsed from the first time point and iii) configured to control the second short-circuit devices to perform short-circuiting, at a third time point after a predetermined time has elapsed from the first time point, wherein the third time point comes after the second time point comes,
the over-voltage prevention device being controllable such that a short-circuit current flows from the first short-circuit device through the resistors into the frequency converter when short-circuiting of the first short-circuit device is canceled.

10. The current rectifying circuit according to claim 9, wherein a resistance of the resistor is smaller than a value obtained by dividing a maximum output voltage of the frequency converter by a maximum current when flowing from the first short-circuit device through the resistor into the frequency converter.

11. The over-voltage prevention device according to claim 9, wherein a resistance of the resistor is a value ensuring that a voltage of a DC link capacitor provided in the frequency converter at a time when a short-circuit current flows into the frequency converter from the first short-circuit device due to restart of the frequency converter is below an operational threshold of the first short-circuit device.

12. The current rectifying circuit according to claim 9, wherein the second short-circuit device is formed of a mechanical breaker.

13. The current rectifying circuit according to claim 9, wherein the second short-circuit device is formed of a plurality of mechanic breakers connected in parallel.

14. The current rectifying circuit according to claim 9, wherein the second short-circuit device is formed of a semiconductor breaker.

15. The current rectifying circuit according to claim 9, wherein the second short-circuit device is formed of a plurality of semiconductor breakers connected in parallel.

* * * * *